United States Patent Office 3,214,205
Patented Oct. 26, 1965

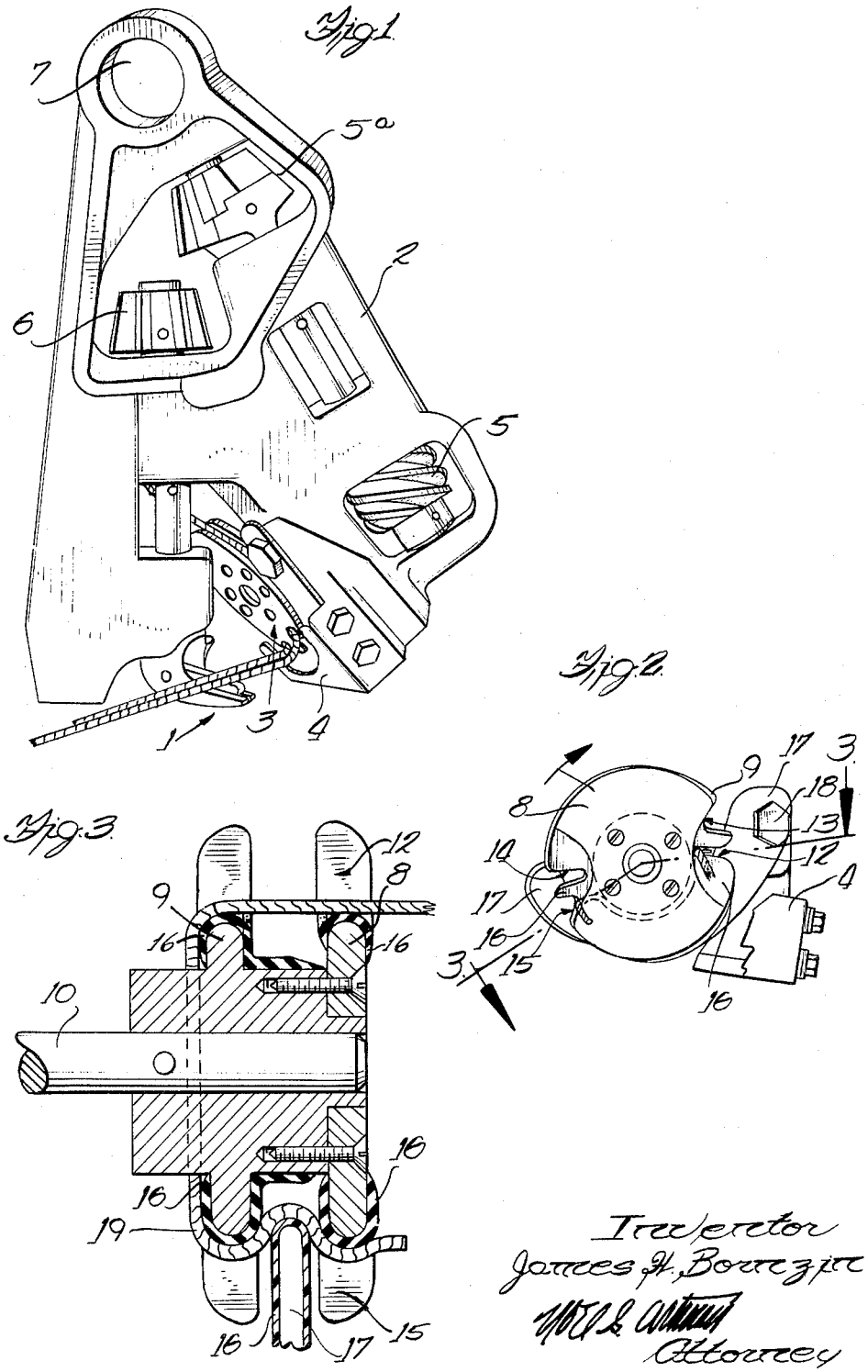

3,214,205
CORD HOLDER FOR KNOTTER
James H. Bornzin, La Grange, Ill., assignor to International Harvester Company, Chicago, Ill., a corporation of New Jersey
Filed Sept. 23, 1963, Ser. No. 310,809
5 Claims. (Cl. 289—13)

This invention pertains to a new and useful improvement in a cord holder for the twine knotter mechanism of a hay baler. More particularly, the invention comprises a cord holder in which portions of the cord holder disks and the keeper blade are covered with rubber or other resilient material.

The objectives of the resilient cover are
First, to reduce breakage of the baling twine;
Second, to eliminate the need for heat treating the metal cord holder elements;
Third, to obtain a firmer grip on the baling twine; and
Fourth, to reduce wear of the cord-gripping surfaces of the cord holder disks and the keeper blade.

One embodiment of the improved cord holder is shown in the drawings, where

FIG. 1 is a general view of a knotter assembly, showing the knotter hook and the cord holder, FIG. 2 is a view of the cord holder of FIG. 1 taken along the axis of the cord holder disks, the knotter hook and a portion of the frame being cut away to give a clear view of the disks, and FIG. 3 is a section through the cord holder disks and the keeper blade, taken on line 3—3 in FIG. 2, showing the extent of the resilient covering.

During the hay baling cycle, both the cord holder and the baling twine are subject to strains. For example, the jars and jolts of the baler plunger packing hay into bales can snap the twine or pull it loose from the cord holder. Also, the forces exerted on the twine by the knotter when forming a knot, or by expansion of the hay (a very resilient material) can cause the same undesirable results. On top of this, the abrasive action of the twine rubbing against the cord holder surfaces causes them to wear and to lose their gripping capacity. If the twine should snap or come loose for any of these reasons, hay will pass through the baler unbound and be scattered in the wake of the machine.

The cord holder of the present invention solves the aforesaid problems by means of a layer of resilient material, such as rubber or the like, located at critical points on the surfaces of the cord holder disks and the keeper blade. The cover material used is sufficiently durable, so as not to rupture or disintegrate under repeated pulls on the twine, yet is sufficiently yieldable so as to be impressed by the twine fibers and to act as a shock absorber, while still offering resistance to slipping of the twine. If a rubber surface is used, it may be applied by vulcanization. A plastic material is applied by a process of heat utilization.

In comparison with a prior art cord holder having bare metal parts (exemplified by U.S. Patent No. 2,405,688), the present cord holder has many virtures. For example, the bare metal parts of prior art cord holders are apt to fracture the baling twine when they grip it; while the resiliently-covered parts of the present cord holder exert a gentle gripping action on the twine. Similarly, twine gripped by the bare metal parts of a prior art holder is likely to snap when subjected to a strong pull, because there is no "give" available other than that inherent in the twine. With the resiliently-covered cord holder described herein, however, the resilient material yields in response to tugs on the twine, thereby relieving the strain on the twine. In addition, the resilient cover provides a more effective gripping surface, prevents wear of the surfaces so covered, and eliminates the need for heat treating or hardening the metal surfaces, since they are not directly exposed to the abrasive action of the twine.

The general arrangement of the cord holder assembly is shown in FIG. 1, where a knotter assembly 1 for forming a knot in the twine is mounted on a frame 2 adjacent to a cord holder 3. A twine knife 4 for cutting the baling twine is mounted on frame 2 alongside the cord holder 3. Power to rotate the cord holder 3 is supplied through the gearing 5; and 5A power to rotate knotter 1 and cord holder 3 is supplied through the gearing 6 and 5A from a power source (not shown). The bore 7 on frame 2 is used to mount frame 2 on the baler adjacent to the source of power for gears 6 and 5A.

The cord holder per se appears in greater detail in FIG. 2 and FIG. 3, which show a cord holder of the two-stage, twin-disk type. Two twin cord holder disks 8 and 9 are mounted on a spindle 10. Pivotally mounted between disks 8 and 9 is a keeper blade 17.

Each disk contains a first pair of slots 12 and 13 and a second pair of slots 14 and 15, the slots on disk 8 being generally aligned with the corresponding slots on disk 9. The slot 15 holds the free end of the twine which then passes through the narrow slot 12 during the bale forming cycle; while the wide slot 13 receives the spool end of the twine when the loop around the bale is completed. Each pair of slots 15 and 12, and 13 and 14, constitutes a cord holding stage, that is, assists in gripping the two strands of twine (the free end and the spool end) involved in one baling cycle. The narrow slots 12 and 14 extend deeper into the disk than the wide slots 13 and 15, so that as the disks 8 and 9 rotate past twine knife 4, the tail of twine in slots 12 and 14 will pass over the knife without being cut. A resilient cover 16 is used at two critical points on each disk; however, the resilient cover could cover the entire surface of each disk. As shown in FIG. 2 and FIG. 3, the resilient cover is placed where the twine contacts the disks during critical points in the cord holding cycle.

The irregularly shaped keeper blade 17 shown in FIG. 2 is mounted on a pivot 18, and extends between disks 8 and 9 (FIG. 3). The contour of keeper blade 17 determines the radial location of the twine between the disks during the cord holding cycle, so as to effect a grip on the twine. A resilient cover 16 (FIG. 3) extends along both sides and the inner edge of the keeper blade.

The operation of the cord holder depends upon several factors, such as, the restricted space between the holder disks and the keeper blade 17, and the cooperation between the contour of the inner edge of the keeper blade and depth of the slots 13 and 15 and the width of the slots 12 and 14. The contour of the inner edge of keeper blade 17 (FIG. 2) varies by pivoting on stud 18, so that at the final holding stage of the cycle its inner edge is closer to the axis of rotation of the cord holder disks than are the bottoms of the slots 13 and 15. If twine 19 is located in the slot 13 of both disks 8 and 9 and the disks are rotated clockwise from the position shown in FIG. 2, the twine 19 in the slots 12 will move under the keeper blade 17. As the contour of the inner edge of the keeper blade assumes a position closer to the axis of rotation of the disks 8 and 9, the inner edge of the keeper blade bears upon the twine 19 and forces it into the space between the holder disks, forming a U-shaped kink in the twine (FIG. 3). The kink, the friction of the restricted space between the holder disks and the keeper blade, and the resilient qualities of the cover on the holder disks and the keeper blade combine to exert a firm grip on the twine.

According to the foregoing description, a new and improved cord holder for a hay baler twine-tying mechanism has been presented. Various modifications in the details of construction of the improved cord holder will be apparent to persons skilled in the art of hay baling. It is not intended, however, to limit the present invention to the exact form shown and described, but to embrace any such obvious variations that fall within the spirit and scope of the attached claims.

The invention claimed is:

1. In a twine-tying mechanism for a hay baler, a cord holder for baling twine, comprising: a plurality of cord-holding elements, at least one of said elements having at least one surface for gripping a strand of baling twine, and resilient means on at least one of said surfaces for cushioning strains imposed on said baling twine.

2. A cord holder as recited in claim 1, wherein said resilient means also functions as an anti-abrasion protective covering for said surface.

3. A cord holder as recited in claim 2, wherein said resilient means is rubber.

4. In a twine-tying mechanism for a hay baler, a cord holder for baling twine, comprising: a spindle, a pair of cord holder disks mounted along said spindle, a keeper blade located between said disks, at least one of said disks and said keeper blade having a least one surface for gripping a strand of baling twine, and resilient means on said one surface for cushioning strains imposed on said twine.

5. A cord holder as recited in claim 4, wherein said resilient means is rubber.

References Cited by the Examiner
UNITED STATES PATENTS

| | | | |
|---|---|---|---|
| 2,246,217 | 6/41 | Noling | 289—2 |
| 2,594,140 | 4/52 | England | 289—14 |

DONALD W. PARKER, *Primary Examiner.*

RUSSELL C. MADER, *Examiner.*